United States Patent [19]

Paschke et al.

[11] 4,382,138

[45] May 3, 1983

[54] POLYAMIDE CONTAINING 4,4'-DIAMINO-2,2', 6,6'-TETRAMETHYLBIPHENYL MOIETIES

[75] Inventors: Edward E. Paschke, Wheaton; J. A. Donohue, Elmhurst, both of Ill.

[73] Assignee: Standard Oil Company (Indiana), Chicago, Ill.

[21] Appl. No.: 305,931

[22] Filed: Sep. 28, 1981

[51] Int. Cl.$^3$ .............................................. C08G 69/32
[52] U.S. Cl. .................................. 528/347; 528/208; 528/229; 528/337; 528/338; 528/339; 528/340; 528/348; 528/349
[58] Field of Search ............... 528/349, 338, 339, 340, 528/347, 348, 208, 229, 337

[56] References Cited

U.S. PATENT DOCUMENTS 3,354,127 11/1967 Hill et al. ............................ 528/349
3,901,854 8/1975 Jones ................................... 528/349

*Primary Examiner*—Harold D. Anderson
*Attorney, Agent, or Firm*—Gunar J. Blumberg; William T. McClain; William H. Magidson

[57] ABSTRACT

Novel copolyamides and polyamides and molding compositions are prepared from 4,4'-diamino-2,2', 6,6'-tetramethylbiphenyl and aliphatic or aromatic diacids, dianhydride and mixtures of diamines. The polyamides and copolyamides are useful as engineering plastics.

64 Claims, No Drawings

POLYAMIDE CONTAINING 4,4'-DIAMINO-2,2', 6,6'-TETRAMETHYLBIPHENYL MOIETIES

BACKGROUND OF THE INVENTION

1. Field of the Invention

The field of the invention relates to polyamides and copolyamides prepared from 4,4'-diamino-2,2',6,6'-tetramethylbiphenyl ($M_2DAM$) and aliphatic or aromatic diacids. $M_2DAM$ and a mixture of other aliphatic or aromatic diamines may also be suitably used to react with the diacids. These novel polyamides and copolyamides are useful in preparing molded articles, fibers, films, laminates and coatings.

2. Background

It is known to make polyamides from acids and diamines. British Patent specification 570,858 discloses various processes for making fiber forming polymers; however, it is clear that the use of $M_2DAM$ to form polyamides and copolyamides useful as moldings, fibers, films, laminates and coatings has not been contemplated in the prior art.

The general object of this invention is to provide novel polyamides based on $M_2DAM$ moieties and aromatic or aliphatic acids or their halide derivatives. Another object is to provide novel copolyamides based on $M_2DAM$ moieties and another aromatic or aliphatic diamine and aromatic or aliphatic acids. A more specific object of this invention is to provide polyamides and copolyamides from $M_2DAM$ moieties and aliphatic, cycloaliphatic, araliphatic and aromatic diamine moieties and aromatic and aliphatic diacid moieties. Another object is to provide a process for the manufacture of copolyamides and polyamides from $M_2DAM$ and diacids or $M_2DAM$ and other diamines and diacids.

We have found that novel polyamides and copolyamides can be formed by reacting $M_2DAM$ with aromatic or aliphatic diacids. We have also found that $M_2DAM$ can be replaced up to 99 percent by other aliphatic or aromatic diamines and the resulting mixture reacted with aromatic or aliphatic diacids. $M_2DAM$ or a mixture of $M_2DAM$ and other aromatic or aliphatic diamines react readily with diacids to form high molecular weight polyamides. In the novel process both aliphatic and aromatic diacids can be polymerized with $M_2DAM$ or $M_2DAM$ and another diamine in the melt to form high molecular weight polyamide. Our process for the manufacture of the novel polyamides and copolyamides comprises reacting about 0.8 to 1.2 moles of $M_2DAM$ with one mole of an aromatic or aliphatic diacid or alternatively a mixture or $M_2DAM$ and another diamine can be reacted with one or more diacids. The molecular ratio of the total diamine moieties may be in the range of 1.2/1 to 1/1.2 preferably in the range of 1.0 to 1.0 to the total diacid moieties. In a suitable method the reaction is conducted as a batch reaction at a temperature of about 0° to 200° C. for a period of about 1 to 60 minutes in an organic polar solvent such as 1-methyl-2-pyrrolidinone, N,N-dimethylacetamide, pyridine, chloroform, or methylenechloride. The polycondensation can also be carried out as a continuous process. The polycondensation can suitably be carried out at a temperature of 0° to 200° C. preferably at a temperature of about 25° to 50° C. The order of addition of the reactants is not critical and all the reactants can be added simultaneously in any order desired. The novel polyamides and copolyamides of this invention have the following structure for polyamides containing only $M_2DAM$:

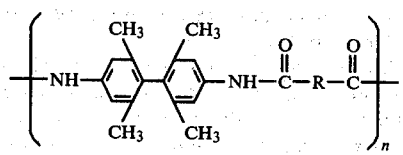

Polyamides and copolyamides containing both $M_2DAM$ and another diamine have the following structure:

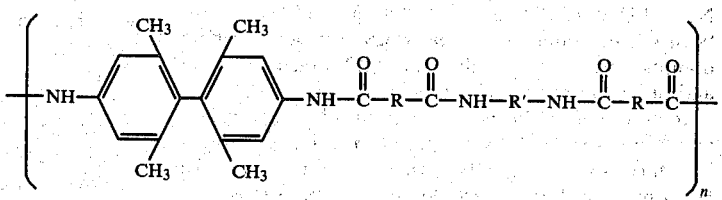

R can be the —$CH_2$— group containing from 0 to 20 repeating units. The preferred aliphatic groups are $CH_2$ taken twice, four times or ten times. Suitable aromatic diacids have the following structures:

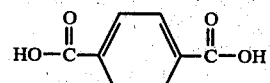

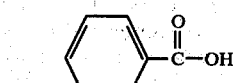

and are derived from terephthalic acid, isophthalic acid and 2,6-naphthylemedicarboxylic acid. In the second structure R has the same values as for the first, but R', meaning the moiety derived from the other diamine, may be a divalent aliphatic hydrocarbon of 2 to 18 carbon atoms or an aromatic hydrocarbon from 8 to 20 carbon atoms or an aromatic hydrocarbon radical containing from 6 to 10 carbon atoms joined directly or by stable linkage comprising from 6 to 20 carbon atoms, or an aromatic hydrocarbon radical containing from 6 to 10 carbon atoms joined directly or by stable linkage comprising —O—, methylene,

—SO—, —SO$_2$—, —S— radicals. The radical R' is derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylethane, xylylene diamine and bis(aminomethyl) cyclohexane. Suitable aromatic diamines useful in our process include para- and meta-phenylenediamine, bis(4-aminophenyl)ether, thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are 1,6 hexanediamine, 1,12 dodecane diamine and bis (4-aminophenyl) ether.

In some cases the polyamides may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyamide and can be conducted in several ways. However all techniques require heating the ground or pelletized polyamide below the melting point of the polyamide, generally at a temperature of about 150° to 250° C. while either sparging with an inert gas such as nitrogen or operating under vacuum. In cases where the polyamides have a low melt temperature, they can be polymerized in the melt under vacuum in thin sections or using thin film reactors known in the art.

Injection molding of the novel polyamide and copolyamide is accompanied by injecting the polyamide into a mold maintained at a temperature of about 23° C. to 200° C. In this process a 20 second to 1 minute cycle is used with a barrel temperature of about 200° C. to 350° C. The latter will vary depending on the Tg of the polymer being molded.

The novel polyamides and copolyamides have excellent thermal properties and can readily be molded in useful articles or formed in fibers, films, laminates or coatings. The polyamides have good tensile strength and are useful in engineering plastics applications. The limiting oxygen index of 45 percent indicates inherent flammability resistance. Infrared spectra of the polyamides and copolyamides have confirmed the copolyamide and polyamide structure. Thermal analysis of the polyamides and copolyamides by thermal gravimetric analysis shows excellent stability. Glass transition temperature, Tg, of the polyamides and copolyamides varied with the particular diamine and diacid used however, the glass transition temperature of the polyamides and copolyamides is at least 171° C. Values range from a Tg of 171° C. to 364° C. We have found that the mechanical properties of the polyamides and copolyamides of this invention are improved by the addition of reinforcing materials. Suitable reinforcing material includes glass fibers, glass beads, industrial materials such as talc, or graphite or mixtures of these. Usually the polyamides contain the reinforcing material in the range of about 25 to 60 percent by weight of the polyamide. In the preferred range the polyamides and copolyamides contain about 30 to about 40 percent by weight of the glass fibers, glass beads, industrial minerals such as talc or graphite or mixtures thereof. The glass fibers are made of alkali-free boron-silicate glass or alkali containing C-glass. The thickness of the fiber is suitably on the average between 3 um and 30 um. It is possible to use both long fibers with average lengths of from 5 to 50 mm and also short fibers of average filament length from 0.05 to 5 mm. In principle, any standard commercial-grade fibers, especially glass fibers, may be used. Glass beads ranging from 5 um to 50 um in diameter may also be used as a reinforcing material. The reinforced polyamides and copolyamides may be prepared in various ways. For example, so-called roving endless glass fiber strands are coated with the polyamide and copolyamide melt and subsequently granulated. The cut fibers or glass beads may also be mixed with granulated polyamide and copolyamide and resulting mixture melted in a conventional extruder, or alternatively the fiber may be directly introduced into the polyamide melt through a suitable inlet into the extruder. Injection molding of the novel glass filled polyamide and copolyamide are accomplished by injecting the polyamide or copolyamide into a mold maintained at a temperature of about 50° to 200° F.

In this process a 25 to 28 second cycle is used with a barrel temperature of about 600° to 650° F. The injection molding conditions are given in Table 1.

TABLE I

| | |
|---|---|
| Mold Temperature | 50 to 200° F. |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 600° F. to 630° F. |
| Barrels: | |
| Front heated to | 600° F. to 630° F. |
| Screw: | |
| 20 to 25 revolutions/minute | |

The following examples illustrate the preferred embodiment of the invention. It will be understood that the examples are for illustrative purposes only and do not purport to be wholly definitive with respect to conditions or scope of the invention.

EXAMPLE 1

To a solution of 4.8 g of M$_2$DAM (0.02 mole), 4.4 g of triethylamine (0.044 mole), and 300 ml of chloroform rapidly stirring in a Waring blender was added a solution of 4.0 g of terephthaloyl chloride (0.02 mole) dissolved in 150 ml of chloroform. Mixing was continued for approximately two minutes. The solid polyamide was filtered, washed with water, and dried to give 6.2 g of product (84% yield).

EXAMPLE 2

To a solution of 4.8 g of M$_2$DAM (0.02 mole), 4.4 g of triethylamine (0.044 mole), and 300 ml of chloroform rapidly stirring in a Waring blender was added a solution of 2.0 g of terephthaloyl chloride (0.02 mole) and 2.0 grams of isophthaloyl chloride (0.02 mole) dissolved in 150 ml of chloroform. Mixing was continued for approximately two minutes. The solid polyamide was filtered, washed with water, and dried to give 5.5 g of product (74% yield).

EXAMPLE 3

To a solution of 4.8 g of M₂DAM (0.02 mole), 4.4 g of triethylamine (0.044 mole), and 300 ml of chloroform rapidly stirring in a Waring blender was added a solution of 4.0 g isophthaloyl chloride (0.02 mole) dissolved in 150 ml of chloroform. Mixing was continued for approximately two minutes. The solid polyamide was filtered, washed with water, and dried to give 6.0 g of product (81% yield).

EXAMPLE 4

To a solution of 4.8 g of M₂DAM (0.02 mole), 4.4 g of triethylamine (0.044 mole), and 300 ml of chloroform rapidly stirring in a Waring blender was added a solution of 4.8 g of sebacyl chloride (0.02 mole) dissolved in 150 ml of chloroform. Mixing was continued for approximately two minutes. The solid polyamide was filtered, washed with water, and dried to give 4.6 g of product (57% yield).

EXAMPLE 5

To a solution of 4.8 g of M₂DAM (0.02 mole), 4.4 g of triethylamine (0.044 mole), and 300 ml of chloroform rapidly stirring in a Waring blender was added a solution of 3.7 g of adipyl chloride (0.02 mole) dissolved in 150 ml of chloroform. Mixing was continued for approximately two minutes. The solid polyamide was filtered, washed with water, and dried to give 3.8 g of product (84% yield).

We claim:

1. An injection moldable polyamide comprising the following recurring structure:

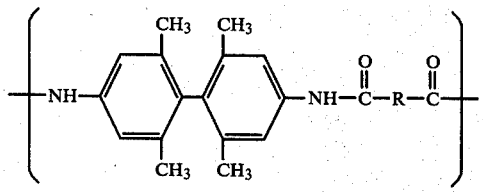

wherein R is a divalent aliphatic or aromatic hydrocarbon radical or a mixture of hydrocarbon radicals and the polyamide has a glass transition temperature in excess of 171° C.

2. The polyamide of claim 1 wherein R is an aliphatic hydrocarbon from 2 to 18 carbon atoms.

3. The polyamide of claim 1 wherein R is an aromatic hydrocarbon from 6 to 20 carbon atoms.

4. The polyamide of claim 1 wherein the aromatic hydrocarbon radical contains from 6 to 10 carbon atoms joined directly or by stable linkage comprising —O—, methylene,

—SO—, —SO₂— or —S— radicals.

5. The polyamide of claim 1 wherein the polyamide is in the form of a molded object.

6. The polyamide of claim 1 wherein the polyamide is in the form of a laminate.

7. The polyamide of claim 1 wherein the polyamide is in the form of a fiber.

8. The polyamide of claim 1 wherein the polyamide is in the form of a film.

9. The polyamide of claim 1 wherein R is a mixture of:

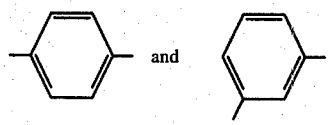

wherein the weight range of the aromatic moieties is about 99:1 to 1:99.

10. The polyamide of claim 9 wherein the polyamide is in the form of a molded object.

11. The polyamide of claim 9 wherein the polyamide is in the form of a film.

12. The polyamide of claim 9 wherein the polyamide is in the form of a fiber.

13. The polyamide of claim 9 wherein the polyamide is in the form of a laminate.

14. The polyamide of claim 1 wherein R is —(CH₂)₁₀—.

15. The polyamide of claim 14 wherein the polyamide is in the form of a molded object.

16. The polyamide of claim 14 wherein the polyamide is in the form of a film.

17. The polyamide of claim 14 wherein the polyamide is in the form of a fiber.

18. The polyamide of claim 14 wherein the polyamide is in the form of a laminate.

19. The polyamide of claim 1 wherein R is —(CH₂)₄—.

20. The polyamide of claim 19 wherein the polyamide is in the form of a molded object.

21. The polyamide of claim 19 wherein the polyamide is in the form of a film.

22. The polyamide of claim 19 wherein the polyamide is in the form of a fiber.

23. The polyamide of claim 19 wherein the polyamide is in the form of a laminate.

24. The polyamide of claim 1 wherein R is:

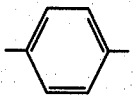

25. The polyamide of claim 24 wherein the polyamide is in the form of a molded object.

26. The polyamide of claim 24 wherein the polyamide is in the form of a film.

27. The polyamide of claim 24 wherein the polyamide is in the form of a fiber.

28. The polyamide of claim 24 wherein the polyamide is in the form of a laminate.

29. The polyamide of claim 1 wherein R is:

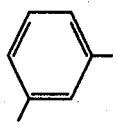

30. The polyamide of claim 29 wherein the polyamide is in the form of a molded object.

31. The polyamide of claim 29 wherein the polyamide is in the form of a film.

32. The polyamide of claim 29 wherein the polyamide is in the form of a fiber.

33. The polyamide of claim 29 wherein the polyamide is in the form of a laminate.

34. The polyamide of claim 1 wherein R is a mixture of:

—(CH$_2$)$_4$— and —(CH$_2$)$_{10}$— wherein the weight range of the moieties is about 99:1 to 1:99.

35. The polyamide of claim 34 wherein the polyamide is in the form of a molded object.

36. The polyamide of claim 34 wherein the polyamide is in the form of a film.

37. The polyamide of claim 34 wherein the polyamide is in the form of a fiber.

38. The polyamide of claim 34 wherein the polyamide is in the form of a laminate.

39. An injection moldable copolyamide comprising the following recurring structure:

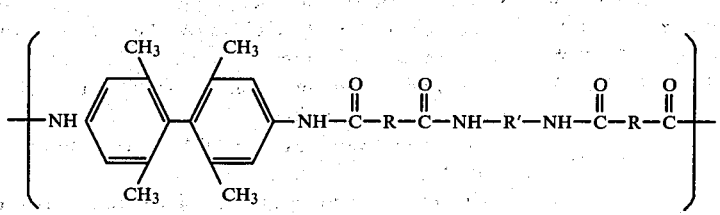

wherein R and R' are the same or different aliphatic hydrocarbon radicals having from 2 to 18 carbon atoms or aromatic hydrocarbon radicals having from 6 to 20 carbon atoms or a mixture of hydrocarbon radicals and the copolyamide has a glass transition temperature in excess of 171° C.

40. The copolyamide of claim 39 wherein R is —(CH$_2$)$_6$—.

41. The copolyamide of claim 40 wherein the copolyamide is in the form of a molded object.

42. The copolyamide of claim 40 wherein the copolyamide is in the form of a film.

43. The copolyamide of claim 40 wherein the copolyamide is in the form of a fiber.

44. The copolyamide of claim 40 wherein the copolyamide is in the form of a laminate.

45. The copolyamide of claim 39 wherein R is —(CH$_2$)$_{10}$—.

46. The copolyamide of claim 45 wherein the copolyamide is in the form of a molded object.

47. The copolyamide of claim 45 wherein the copolyamide is in the form of a film.

48. The copolyamide of claim 45 wherein the copolyamide is in the form of a fiber.

49. The copolyamide of claim 45 wherein the copolyamide is in the form of a laminate.

50. The copolyamide of claim 39 wherein R is:

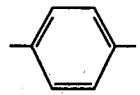

51. The copolyamide of claim 50 wherein the copolyamide is in the form of a molded object.

52. The copolyamide of claim 50 wherein the copolyamide is in the form of a film.

53. The copolyamide of claim 50 wherein the copolyamide is in the form of a fiber.

54. The copolyamide of claim 50 wherein the copolyamide is in the form of a laminate.

55. The copolyamide of claim 49 wherein R is:

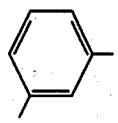

56. The copolyamide of claim 55 wherein the copolyamide is in the form of a molded object.

57. The copolyamide of claim 55 wherein the copolyamide is in the form of a film.

58. The copolyamide of claim 55 wherein the copolyamide is in the form of a fiber.

59. The copolyamide of claim 55 wherein the copolyamide is in the form of a laminate.

60. The copolyamide of claim 39 wherein R is a mixture of:

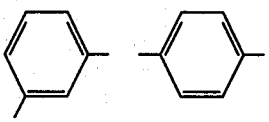

wherein the weight range of the aromatic moieties is about 99:1 to 1:99.

61. The copolyamide of claim 60 wherein the copolyamide is in the form of a molded object.

62. The copolyamide of claim 60 wherein the copolyamide is in the form of a film.

63. The copolyamide of claim 60 wherein the copolyamide is in the form of a fiber.

64. The copolyamide of claim 60 wherein the copolyamide is in the form of a laminate.

* * * * *